United States Patent
Ponnaluri et al.

(10) Patent No.: US 7,518,893 B2
(45) Date of Patent: Apr. 14, 2009

(54) METHOD FOR OPERATION OF A CONVERTER CIRCUIT, AS WELL AS AN APPARATUS FOR CARRYING OUT THE METHOD

(75) Inventors: Srinivas Ponnaluri, Untersiggenthal (CH); Jürgen Steinke, Albbruck (DE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 11/826,480

(22) Filed: Jul. 16, 2007

(65) Prior Publication Data
US 2007/0263418 A1 Nov. 15, 2007

Related U.S. Application Data

(63) Continuation of application No. PCT/CH2005/000293, filed on May 24, 2005.

(60) Provisional application No. 60/646,544, filed on Jan. 25, 2005.

(51) Int. Cl.
*H02M 3/06* (2006.01)
*H02M 5/275* (2006.01)

(52) U.S. Cl. .................. 363/62; 363/44; 363/56.1; 363/163

(58) Field of Classification Search ............ 363/44, 363/56.1, 56.11, 56.12, 62, 163
See application file for complete search history.

(56) References Cited

U.S. PATENT DOCUMENTS

| | | | |
|---|---|---|---|
| 6,507,505 B2 * | 1/2003 | Oka et al. | 363/47 |
| 7,035,124 B2 * | 4/2006 | Chadwick et al. | 363/40 |
| 2001/0048604 A1 | 12/2001 | Oka et al. | |

FOREIGN PATENT DOCUMENTS

DE 41 15 010 A1 11/1992

OTHER PUBLICATIONS

Bojrup M et al: "A Multiple Rotating Integrator Controller for Active Filters" 8th European conference on Power Electronics and Applications. Lausanne CH, Sep. 7-9, 1999, EPE. European conference on Power Electronics and Applications, Brussls : EPE Association BE, vol. Conf. 8, Sep. 7, 1999, pp. 1-9, XP00878439.

(Continued)

*Primary Examiner*—Jessica Han
*Assistant Examiner*—Emily Pham
(74) *Attorney, Agent, or Firm*—Buchanan Ingersoll & Rooney PC

(57) ABSTRACT

A method for operation of a converter circuit is specified, wherein the converter circuit has a converter unit with a multiplicity of drivable power semiconductor switches and an LCL filter which is connected to each phase connection of the converter unit, in which method the drivable power semiconductor switches are driven by means of a drive signal which is formed from reference voltages. The reference voltages are formed by subtraction of damping voltages from reference-phase connection voltages, with the damping voltages being formed from filter capacitance currents, weighted with a variable damping factor of the LCL filter. An apparatus for carrying out the method is also specified.

11 Claims, 3 Drawing Sheets

OTHER PUBLICATIONS

Bojrup M et al: "A dual purpose batter charger for electric vehicles" Power Electronics Specialist Conference, 1998. PESC 98 Record. 29th Annual IEEE Fukuoka, Japan May 17, 1998 New York, NY, USA,IEEE, US vol. 1, May 17, 1998, pp. 565-570, XP010294935.

Lee S J et al: "A harmonic reference frame based current controller for active filter" Applied Power Electronics Conference and Exposition, 2000. APEC 2000. Fifteenth Annual IEEE New Orleans, LA, USA Feb. 6-10, 2000, Piscataway, NJ, USA,IEEE, US, vol. 2, Feb. 6, 2000, pp. 1073-1078, XP010371636.

Teodorescu R et al: "A stable three-phase LCL-filter based active rectifier without damping" Conference Record of the 2003 IEEE Industry Applications Conference. 38th. IAS Annual Meeting. Salt Lake City, UT, Oct. 12-16, 2003, Conference Record of the IEEE Industry Applications Conference. IAS Annual Meeting, New York, NY: IEEE, US, vol. vol. 3 of 3. conf. 38, Oct. 12, 2003, pp. 1552-1557, XP010676201.

Macken K J et al: "Distributed control of renewal generation units with integrated active filter" PESC'03. 2003 IEEE 34th. Annual Power Electronics Specialists Conference. Conference Proceedings. Acapulco, Mexico, Jun. 15-19, 2003, Annual Power Electronics Specialists Conference, New York NY: IEEE, US, vol. vol. 4 of 4, Conf. 34, Jun. 15, 2003, pp. 741-747, XP010648902.

Dahono, A Control Method to Damp Oscillation in the Input LC Fileter of AC-DC PWM Converters IEEE, 2002, pp. 1630-1635.

International Search Report.

International Preliminary Report on Patentability (IPRP) from the corresponding International Application No. PCT/CH2005/000293.

* cited by examiner

US 7,518,893 B2

METHOD FOR OPERATION OF A CONVERTER CIRCUIT, AS WELL AS AN APPARATUS FOR CARRYING OUT THE METHOD

RELATED APPLICATIONS

This application claims priority under 35 U.S.C. §119 to U.S. Provisional Application 60/646,544 filed in USA on Jan. 25, 2005, and as a continuation application under 35 U.S.C. §120 to PCT/CH2005/000293 filed as an International Application on May 24, 2005, designating the U.S., the entire contents of which are hereby incorporated by reference in their entireties.

TECHNICAL FIELD

The disclosure relates to the field of power electronics, and is based on a method for operation of a converter circuit, as well as an apparatus for carrying out the method.

BACKGROUND INFORMATION

Known converter circuits have a converter unit with a multiplicity of drivable power semiconductor switches, which are connected in a known manner in order to switch at least two switching voltage levels. An LCL filter is connected to each phase connection of the converter unit. A capacitive energy store is also connected to the converter unit, and is normally formed by one or more capacitors. An apparatus is provided for operation of the converter circuit, which apparatus has a regulation device for production of reference voltages and is connected via a drive circuit for formation of a drive signal from the reference voltages to the drivable power semiconductor switches. The power semiconductor switches are thus driven by means of the drive signal.

The converter circuit mentioned above is subject to the problem but the LCL filters can cause permanent distortion, that is to say undesirable oscillations, in the filter output currents and filter voltages, resulting from resonant oscillations of the LCL filters. In an electrical ac voltage supply system, which is typically connected to the filter outputs, or in an electrical load which is connected to the filter outputs, such distortion can lead to damage or even destruction, and is therefore very undesirable.

SUMMARY

A method is disclosed for operation of a converter circuit, by means of which it is possible to actively damp distortion, caused by LCL filters connected to the converter circuit, in the filter output currents and filter output voltages. An apparatus is disclosed, by means of which the method can be carried out in a particularly simple manner.

The converter circuit has a converter unit with a multiplicity of drivable power semiconductor switches, and an LCL filter which is connected to each phase connection of the converter unit. In an exemplary method for operation of the converter circuit, the drivable power semiconductor switches are now driven by means of a drive signal which is formed from reference voltages. According to the disclosure, the reference voltages are formed from the subtraction of damping voltages from reference-phase connection voltages, with the damping voltages being formed from filter capacitance currents (which are weighted with a variable damping factor) of the LCL filters. The damping voltages are thus proportional to the filter capacitance currents and are then subtracted from the reference-phase connection voltages, which is equivalent to connection of a damping resistance to each phase connection of the converter unit. Distortion, that is to say undesirable oscillations, in the filter output currents and filter output voltages can therefore advantageously be actively damped, so that this type of distortion is greatly reduced and, in the ideal case, is very largely suppressed. A further advantage of the exemplary method is that there is no need to connect any discrete, highly space-consuming damping resistor, which is complex to provide and is therefore expensive, to each phase connection in order to allow the undesirable distortion to be effectively damped.

An exemplary apparatus for carrying out the method for operation of the converter circuit has a regulation device which is used to produce reference voltages and is connected via a drive circuit for formation of a drive signal to the drivable power semiconductor switches. According to the disclosure, the regulation device has a first calculating unit for formation of reference voltages from the subtraction of damping voltages from reference-phase connection voltages, with the first calculation unit being supplied with reference-phase connection voltages and, in order to form the damper voltages, filter capacitance currents of the LCL filters. Furthermore, the regulation device has a regulator unit for production of the reference-phase connection voltages. The exemplary apparatus for carrying out the method for operation of the converter circuit can thus be implemented very easily and cost-effectively, since the circuit complexity can be kept extremely low and, furthermore, only a small number of components are required to construct it. The exemplary method can thus be carried out particularly easily by means of this apparatus.

BRIEF DESCRIPTION OF THE DRAWINGS

These and further objects, advantages and features of the invention will become evident from the following detailed description of exemplary embodiments of the invention, in conjunction with the drawing. In the figures.

Figure 1:
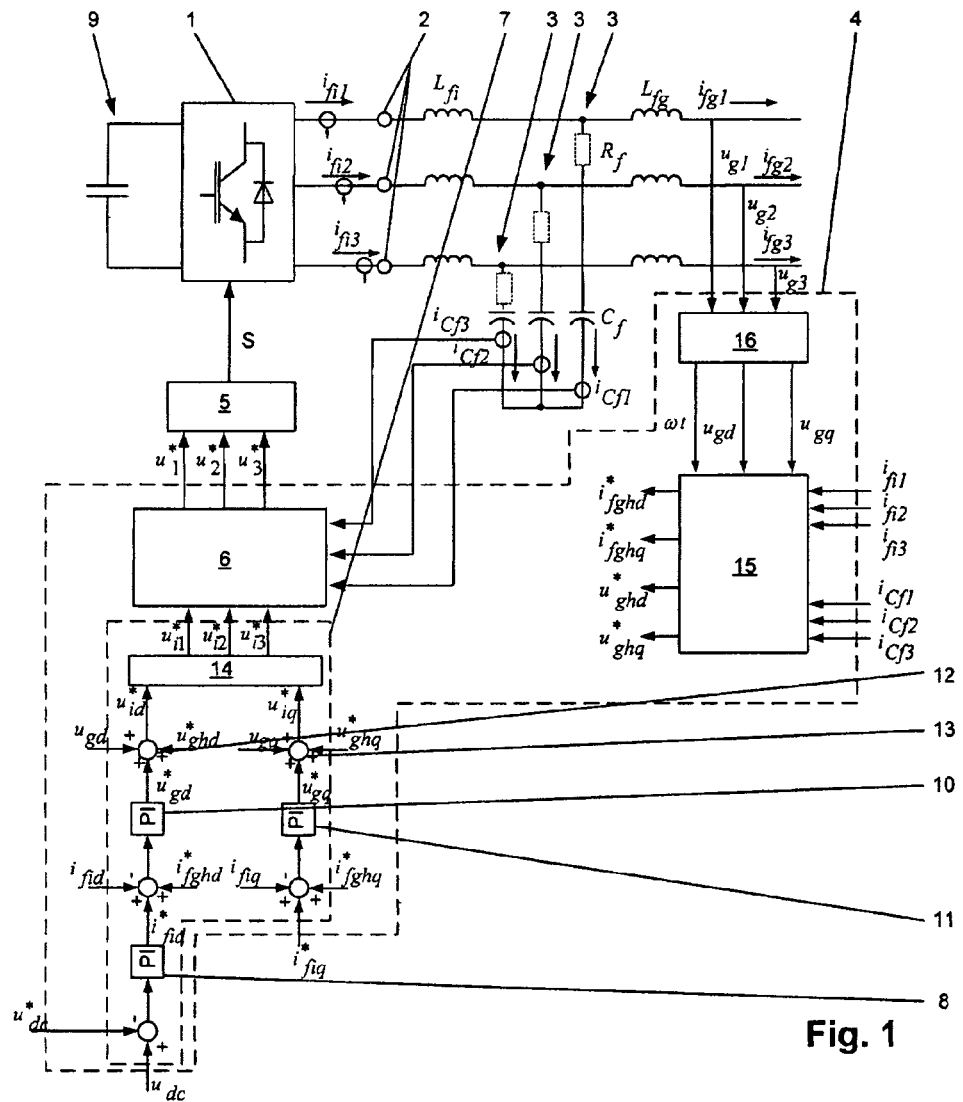
FIG. 1 shows one exemplary embodiment of an apparatus for carrying out an exemplary method for operation of a converter circuit.

The reference symbols used in the drawing, and their meanings, are listed in a summarized form in the list of reference symbols. In principle, identical parts are provided with the same reference symbols in the figures. The described exemplary embodiments represent examples of the subject matter of the invention, and have no restrictive effect.

DETAILED DESCRIPTION

FIG. 1 shows one exemplary embodiment of an apparatus for carrying out an exemplary method for operation of a converter circuit. As shown in FIG. 1, the converter circuit has a converter unit 1 with a multiplicity of drivable power semiconductor switches and an LCL filter 3, which is connected to each phase connection 2 of the converter unit 1. Each LCL filter 3 accordingly has a first filter inductance $L_{fi}$, a second filter inductance $L_{fg}$ as well as a filter capacitance $C_{f}$, with the first filter inductance $L_{fi}$ being connected to the associated phase connection 2 of the converter unit 1, to the second filter inductance $L_{fg}$ and to the filter capacitance $C_f$. Furthermore, the filter capacitances $C_f$ of the individual LCL filters 3 are connected to one another. Each LCL filter 3 typically has a virtually negligible filter resistance $R_f$, which is connected in series with the filter capacitance $C_f$ of the associated LCL filter 3 and represents resistive losses in the LCL filter 3. By way of example, the converter unit 1 shown in FIG. 1 is a three-phase unit. It should be mentioned that the converter unit 1 may in general be any form of converter unit 1 for switching of $\geq 2$ switching voltage levels (multi-level converter circuit) with respect to the voltage of a capacitive energy store 9 which is connected to the converter unit 1, with the capacitive energy store 9 then being formed by any desired number of capacitances, which are then connected such that they are matched to the appropriately configured converter circuit element.

In an exemplary method for operation of the converter circuit, the drivable power semiconductor switches of the conversion unit 1 are now driven by means of a drive signal S which is formed from reference voltages $u^*_1$, $u^*_2$, $u^*_3$. A look-up table is normally used to form the drive signal, in which appropriate drive signals are permanently associated with reference voltage values, or a modulator which is based on pulse-width modulation. According to the disclosure, the reference voltages $u^*_1$, $u^*_2$, $u^*_3$ are formed from subtraction of damping voltages $u_{d1}$, $u_{d2}$, $u_{d3}$ from reference-phase connection voltages $u^*_{i1}$, $u^*_{i2}$, $u^*_{i3}$, with the damping voltages $u_{d1}$, $u_{d2}$, $u_{d3}$ being formed from filter capacitance currents $i_{Cf1}$, $i_{Cf2}$, $i_{Cf3}$, which are weighted with a variable damping factor $K_f$, of the LCL filters 3, as illustrated in particular by the following formula.

$$u_d = K_f i_{Cf}$$

The damping voltages $u_{d1}$, $u_{d2}$, $u_{d3}$ are thus proportional to the filter capacitance currents $i_{Cf1}$, $i_{Cf2}$, $i_{Cf3}$ and are then subtracted from the reference-phase connection voltages $u^*_{i1}$, $u^*_{i2}$, $u^*_{i3}$, which corresponds to the connection of a damping resistor to each phase connection 2 of the converter unit 1. This advantageously allows active damping of distortion, that is to say undesirable oscillations, in the filter output currents $i_{fg1}$, $i_{fg2}$, $i_{fg3}$ and filter output voltages $u_{g1}$, $u_{g2}$, $u_{g3}$, that this distortion is greatly reduced and, in the ideal case is very largely suppressed. Furthermore, there is no need for connection of discrete, very space-consuming damping resistors, which are complex to implement and are therefore expensive to the respective phase connection in order to allow effective damping of the undesirable distortion.

The damping factor $K_f$ can be set such that the undesirable oscillations of the filter output voltages $u_{g1}$, $u_{g2}$, $u_{g3}$ or of phase-connection voltages, e.g., harmonics, are just not amplified.

As shown in FIG. 1, an exemplary apparatus for carrying out an exemplary method for operation of a converter circuit for this purpose has a regulation device 4, which is used to produce the reference voltages $u^*_1$, $u^*_2$, $u^*_3$ and is connected via a drive circuit 5 for formation of the drive signal S to the drivable power semiconductor switches. By way of example, the drive circuit 5 has a look-up table in which appropriate drive signals are permanently associated with reference-voltage values, or a modulator which is based on pulse-width modulation. According to the disclosure, the regulation device 4 has a first calculation unit 6 for formation of reference voltages $u^*_1$, $u^*_2$, $u^*_3$ from the subtraction of damping voltages $u_{d1}$, $u_{d2}$, $u_{d3}$ from reference-phase connection voltages $u^*_{i1}$, $u^*_{i2}$, $u^*_{i3}$, with the first calculation unit 6 being supplied with reference-phase connection voltages $u^*_{i1}$, $u^*_{i2}$, $u^*_{i3}$ and, in order to form the damper voltages $u_{d1}$, $u_{d2}$, $u_{d3}$, filter capacitance currents $i_{Cf1}$, $i_{Cf2}$, $i_{Cf3}$ of the LCL filters 3. As shown in FIG. 1, the filter capacitance currents $i_{Cf1}$, $i_{Cf2}$, $i_{Cf3}$ are measured by appropriate measurement devices. Furthermore, the regulation device 4 has a regulation unit 7 for production of the reference-phase connection voltages $u^*_{i1}$, $u^*_{i2}$, $u^*_{i3}$. The exemplary apparatus for carrying out the method for operation of the converter circuit can accordingly be produced very easily and cost-effectively, since the circuit complexity can be kept extremely low and, furthermore, only a small number of components are required to construct it. This apparatus allows the exemplary method to be carried out particularly easily.

It has been found to be advantageous for the filter capacitance currents $i_{Cf1}$, $i_{Cf2}$, $i_{Cf3}$ to be filtered by means of a high-pass filter. This means that the damping voltages $u_{d1}$, $u_{d2}$, $u_{d3}$ are formed only from harmonics of the filter capacitance currents $i_{Cf1}$, $i_{Cf2}$, $i_{Cf3}$, in particular higher-frequency harmonics of the filter capacitance currents $i_{Cf1}$, $i_{Cf2}$, $i_{Cf3}$, and the variable damping factor $K_f$, so that the active damping can advantageously act only on the harmonics in the filter output currents $i_{fg1}$, $i_{fg2}$, $i_{fg3}$ and filter output voltages $u_{g1}$, $u_{g2}$, $u_{g3}$. High-pass filtering of the filter capacitance currents $i_{Cf1}$, $i_{Cf2}$, $i_{Cf3}$ is carried out by a high-pass filter which is connected between the measurement devices for measurement of the filter capacitance currents $i_{Cf1}$, $i_{Cf2}$, $i_{Cf3}$ and the first calculation unit 6, with the high-pass filter not being shown in FIG. 1, for clarity reasons.

The reference-phase connection voltages $u^*_{i1}$, $u^*_{i2}$, $u^*_{i3}$ are formed from a d-component of the Park-Clarke transformation (produced by regulation of the dc voltage $u_{dc}$ of a capacitive energy store 9 which is connected to the converter unit 1 at a dc voltage reference value $u^*_{dc}$ of reference-phase connection currents $i^*_{fid}$ and from a predeterminable q-component of the Park-Clarke transformation of the reference-phase connection currents $i^*_{fiq}$. The regulation can be carried out using a proportional-integral characteristic. As shown in FIG. 1, the regulator unit 7 for regulation of the dc voltage $u_{dc}$ of the capacitive energy store 9 at the dc voltage reference value $u^*_{dc}$ has a first proportional-integral regulator 8, to whose input the difference between the dc voltage ($u_{dc}$) of the capacitive energy store 9 and the dc voltage reference value $u^*_{dc}$ is supplied, and at whose output the d-component of the Park-Clarke transformation of the reference-phase connection currents $i^*_{fid}$ is produced.

The Park-Clarke transformation is in general defined as:

$$\bar{x} = (x_d + j x_q) e^{j \omega t}$$

using the variables illustrated in FIG. 1:

$$\bar{u}_g = u_{g1} + u_{g2} e^{jy} + u_{g3} e^{j2y}$$

$$\bar{i}_{fi} = i_{fi1} + i_{fi2} e^{jy} + i_{fi3} e^{j2y}$$

$$\bar{i}_{Cf} = i_{Cf1} + i_{Cf2} e^{jy} + i_{Cf3} e^{j2y}$$

$$\bar{i}_{fg} = i_{fg1} + i_{fg2} e^{jy} + i_{fg3} e^{j2y}$$

where $y = 2\pi/3$, where $\bar{x}$ is a complex variable, $x_d$ is the d-component of the Park-Clarke transformation of the variable $\bar{x}$ and $x_q$ is the q-component of the Park-Clarke transformation of the variable $\bar{x}$ All of the Park-Clarke transformations of variables which have already been mentioned and those which will be mentioned in the following text are produced using the formula quoted above. The Park-Clarke transformation advantageously transforms not only the fundamental of the complex variable $\bar{x}$, but also all of the harmonics that occur of the complex variable $\bar{x}$.

The regulation device 4 shown in FIG. 1 has a third calculation unit 16 for formation of the d-component of the Park-Clarke transformation of the filter output voltages $u_{gd}$, of the q-component of the Park-Clarke transformation of the filter output voltages $u_{gq}$ and of the fundamental angle ωt of the filter output voltages $u_{g1}$, $u_{g2}$, $u_{g3}$, with the input side of the third calculation unit 16 being supplied with the filter output voltages $u_{g1}$, $u_{g2}$, $u_{g3}$ of the LCL filters 3. The third calculation unit 16 can be a phase locked loop, in which case the Park-Clarke transformations of the individual variables are carried out using the definitions given above.

Furthermore, the d-component of the Park-Clarke transformation of the reference-filter output voltages $u^*_{gd}$ is produced by regulation of the d-component of the Park-Clarke transformation of the phase connection current $i_{fid}$ at the sum of the d-component of the Park-Clarke transformation of the reference-phase connection currents $i^*_{fid}$ and a d-component of the Park-Clarke transformation of at least one harmonic of filter output currents $i^*_{fghd}$ with respect to the fundamental of the filter output currents $i_{fg1}$, $i_{fg2}$, $i_{fg3}$. The regulation can be carried out using a proportional-integral characteristic. Furthermore, the q-component of the Park-Clarke transformation of the reference filter output voltages $u^*_{gq}$ is produced by regulation of the q-component of the Park-Clarke transformation of the phase connection currents $i_{fiq}$ at the sum of the q-component of the Park-Clarke transformation of the reference-phase connection currents $i^*_{fiq}$ and a q-component of the Park-Clarke transformation of at least one harmonic of the filter output currents $i^*_{fghq}$ with respect to the fundamental of the filter output currents $i_{fg1}$, $i_{fg2}$, $i_{fg3}$. The regulation can be carried out using a proportional-integral characteristic. The index h of the d-component and the q-component of the Park-Clarke transformation of a harmonic of the filter output currents $i^*_{fghd}$ $i^*_{fghq}$ represents the h-th harmonic of these variables, where h=1, 2, 3, . . . The additional variables introduced in the following text with the index h likewise use the index h for the h-th harmonic of the associated variable, h=1, 2, 3, . . . As shown in FIG. 1, the regulator unit 7 for regulation of the d-component of the Park-Clarke transformation of the phase connection currents $i_{fid}$ at the sum of the d-component of the Park-Clarke transformation of the reference phase connection currents $i^*_{fid}$ and a d-component of the Park-Clarke transformation of at least one harmonic of the filter output currents $i^*_{fghd}$ with respect to the fundamental of the filter output currents $i_{fg1}$, $i_{fg2}$, $i_{fg3}$ has a second proportional-integral regulator 10 to whose input side the difference between the sum of the d-component of the Park-Clarke transformation of the reference-phase connection currents $i^*_{fid}$ and a d-component of the Park-Clarke transformation of at least one harmonic of the filter output currents $i^*_{fghd}$ with respect to the fundamental of the filter output currents $i_{fg1}$, $i_{fg2}$, $i_{fg3}$ and the d-component of the Park-Clarke transformation of the phase connection currents $i_{fid}$ are supplied, and on whose output side the d-components of the Park-Clarke transformation of the reference-filter output voltages $u^*_{gd}$ is produced. Furthermore, for regulation of the q-component of the Park-Clark transformation of the phase connection currents $i_{fiq}$ at the sum of the q-component of the Park-Clarke transformation of the reference phase connection currents $i^*_{fiq}$ and the q-component of the Park-Clarke transformation of at least one harmonic of the filter output currents $i^*_{fghq}$ with respect to the fundamental of the filter output currents $i_{fg1}$, $i_{fg2}$ $i_{fg3}$, the regulator unit 7 has a third proportional-integral regulator 11 to whose input side the difference between the sum of the q-component of the Park-Clarke transformation of the reference phase connection currents $i^*_{fiq}$ and a q-component of the Park-Clarke transformation of at least one harmonic of the filter output currents $i^*_{fghq}$ with respect to the fundamental of the filter output currents $i_{fg1}$, $i_{fg2}$, $i_{fg3}$ and the q-components of the Park-Clarke transformation of the phase connection currents $i_{fiq}$ are supplied, and on whose output side the q-component of the Park-Clarke transformation of the reference-filter output voltages $u^*_{gq}$ is produced.

Furthermore, the d-component of the Park-Clarke transformation of the reference-phase connection voltages $u^*_{id}$ is produced by the sum of the d-component of the Park-Clarke transformation of the reference filter output voltages $u^*_{gd}$ and the d-component of the filter output voltages $u_{gd}$ and a d-component of the Park-Clarke transformation of at least one harmonic of the filter output voltages $u^*_{ghd}$. In addition the q-component of the Park-Clarke transformation of the reference-phase connection voltages $u^*_{iq}$ is produced by the sum of the q-component of the Park-Clarke transformation of the reference-filter output voltages $u^*_{gq}$ and the q-component of the Park-Clarke transformation of the filter-output voltages $u_{gq}$ and a q-component of the Park-Clarke transformation of at least one harmonic of the filter output voltages $u^*_{ghq}$. In order to produce the d-component of the Park-Clarke transformation of the reference-phase connection voltages $u^*_{id}$, the regulator unit 7 has a first adder 12, to which the d-component of the Park-Clarke transformation of the reference filter output voltages $u^*_{gd}$, the d-component of the filter output voltages $u_{gd}$ and the d-component of the Park-Clarke transformation of at least one harmonic of the filter output voltages $u^*_{ghd}$ are supplied. In addition, in order the produce the q-component of the Park-Clarke transformation of the reference phase connection voltages $u^*_{iq}$, the regulator unit 7 has, as shown in FIG. 1, a second adder 13, to which the q-component of the Park-Clarke transformation of the reference-filter output voltages $u^*_{gq}$, the q-component of the Park-Clarke transformation of the filter output voltages $u_{gq}$ and the q-component of the Park-Clarke transformation of at least one harmonic of the filter output voltages $u^*_{ghq}$ are supplied.

Figure 2:
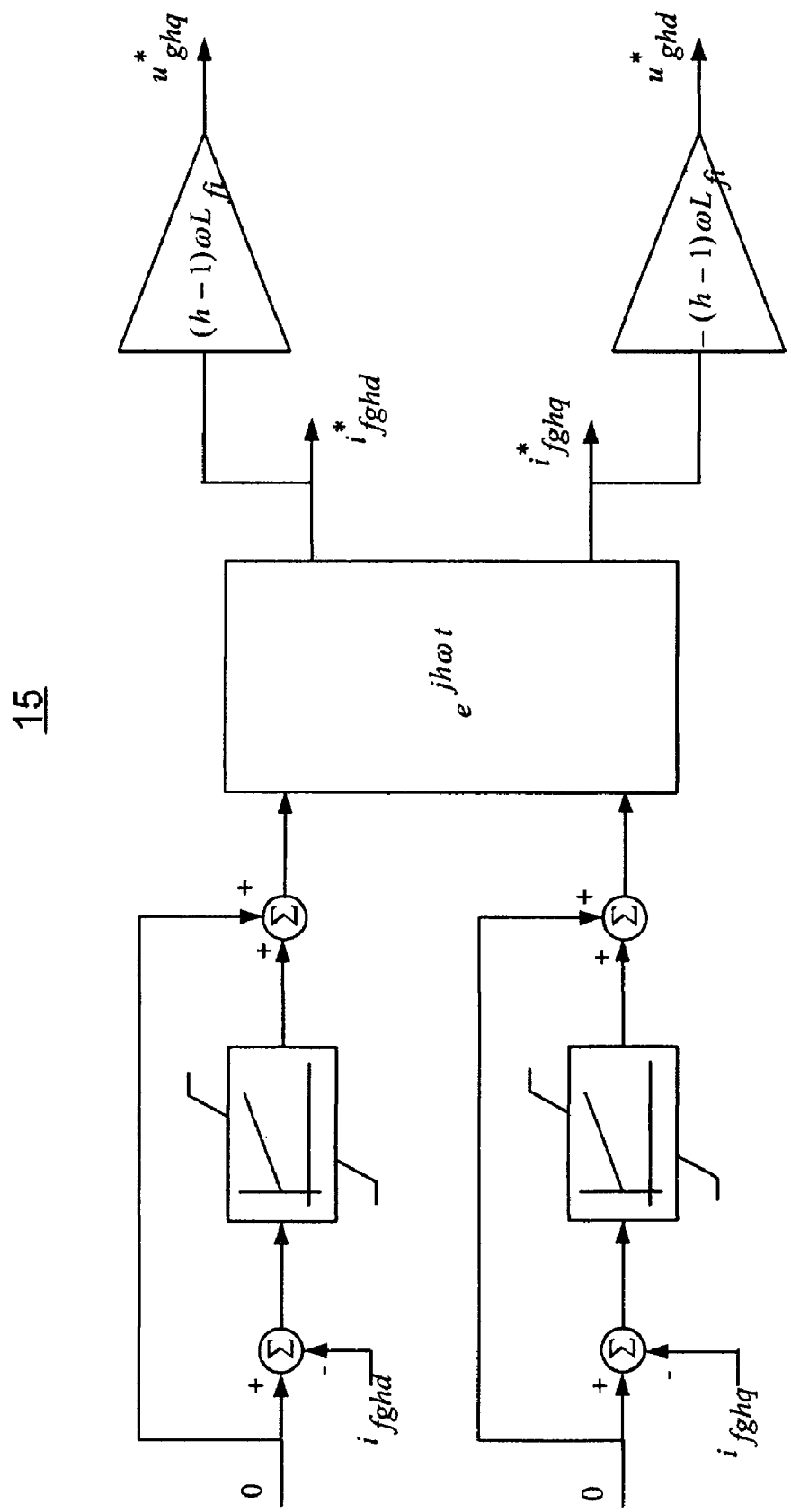
FIG. 2 shows one exemplary embodiment of a second calculation unit.

In order to form the d-component of the Park-Clarke transformation, as has already been mentioned above, of at least one harmonic of the filter output currents $i^*_{fghd}$ with respect to the fundamental of the filter output currents $i_{fg1}$, $i_{fg2}$, $i_{fg3}$, the q-component of the Park-Clarke transformation of at least one harmonic of the filter output currents $i^*_{fghq}$ with respect to the fundamental of the filter output currents $i_{fg1}$, $i_{fg2}$, $i_{fg3}$, the d-component of the Park-Clarke transformation of the at least one harmonic of the reference filter output voltages $u^*_{ghd}$ and the q-component of the Park-Clarke transformation of the at least one harmonic of the reference-filter output voltages $u^*_{ghq}$ the regulation unit 4 has a second calculation unit 15, as shown in FIG. 1. As shown in FIG. 1, the input side of the second calculation unit 15 is supplied with the d-component with the filter output voltages $u_{gd}$, the q-component of the filter output voltages $u_{gq}$, the phase connection currents $i_{fi1}$, $i_{fi2}$, $i_{fi3}$, the filter capacitance currents $i_{Cf1}$, $i_{Cf2}$, $i_{Cf3}$ and the fundamental angle ωt of the filter output voltages $u_{g1}$, $u_{g2}$, $u_{g3}$. In order to illustrate the formation of the individual variables in the calculation unit 15, FIG. 2 shows one exemplary embodiment of the second calculation unit 15, in which the input variables shown in FIG. 2 are obtained using the following formula:

$$i_{fghd} + ji_{fghq} = i_{fihd} + ji_{fihq} - (i_{Cfhd} + ji_{Cfhg})$$

with the d-components of the Park-Clarke transformation and the q-components of the Park-Clarke transformation being obtained by applications of the Park-Clarke transformation to the measured phase connection currents $i_{fi1}, i_{fi2}, i_{fi3}$ including the associated harmonics, and filter capacitance currents $i_{Cf1}, i_{Cf2}, i_{Cf3}$ including the associated harmonics. This Park-Clarke Clarke transformation is carried out in particular in the second calculation unit 15, although this is not illustrated in the second calculation unit 15 shown in FIG. 2, for clarity reasons.

Finally, the reference-phase connection voltages $u^*_{i1}, u^*_{i2}, u^*_{i3}$ are produced by an inverse Park-Clarke transformation of the d-component of the Park-Clarke transformation of the reference-phase connection voltages $u^*_{id}$ and the q-component of the Park-Clarke transformation of the reference-phase connection voltages $u^*_{iq}$. As shown in FIG. 1, the regulator unit 7 for this purpose has a calculation unit 14 for formation of the reference-phase connection voltages $u^*_{i1}, u^*_{i2}, u^*_{i3}$ by inverse Park-Clarke transformation, to whose input side the d-component of the Park-Clarke transformation of the reference-phase connection voltages $u^*_{id}$ and the q-component of the Park-Clarke transformation of the reference-phase connection voltages $u^*_{iq}$ are supplied.

Figure 3:
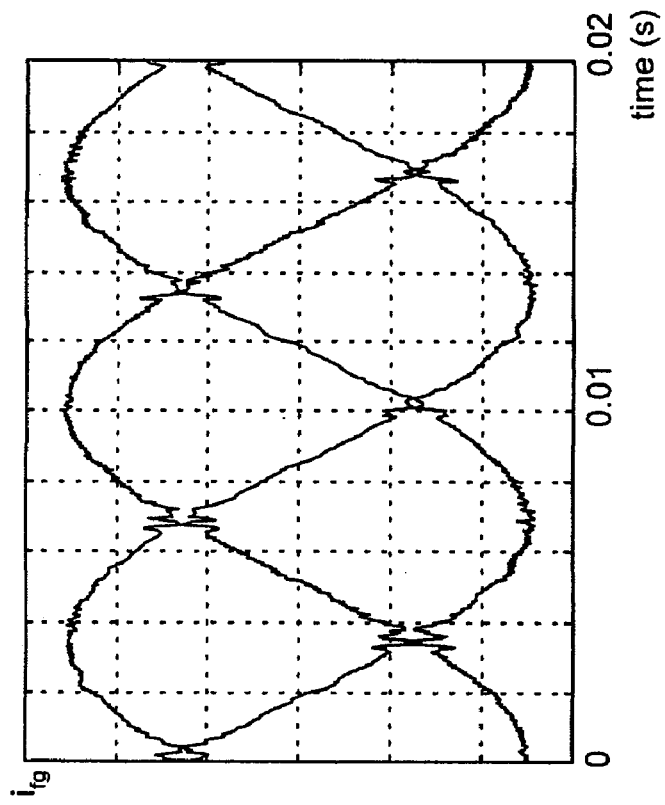
FIG. 3 shows a waveform of the filter output currents with active damping using an exemplary method.
Figure 4:
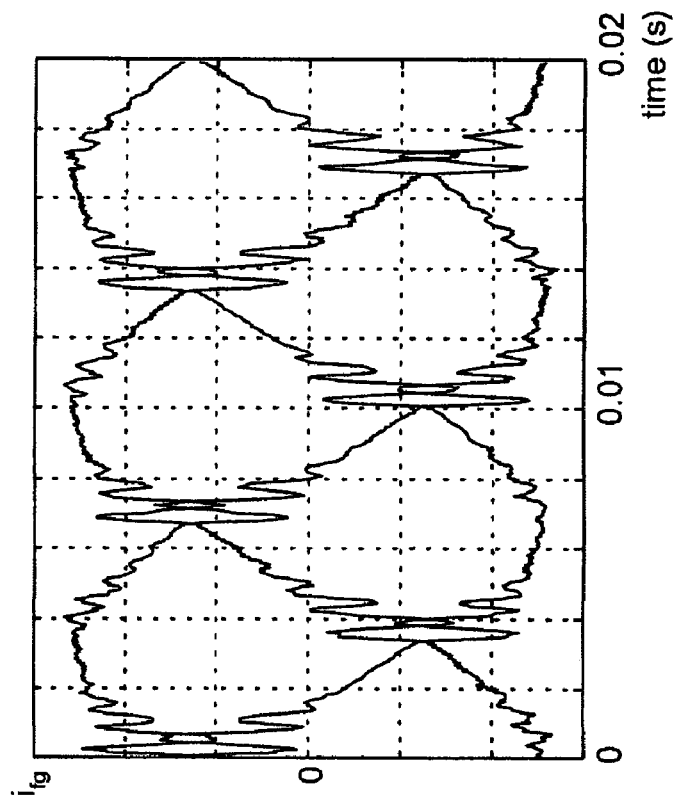
FIG. 4 shows a waveform of the filter output currents with active damping and additional active reduction of harmonics using an exemplary method.

In order to illustrate an exemplary method of operation of the active damping based on the exemplary method as explained above, FIG. 3 shows a waveform of the filter output currents $i_{fg1}, i_{fg2}, i_{fg3}$ in which undesirable oscillations in the filter output currents $i_{fg1}, i_{fg2}, i_{fg3}$ are actively damped, so that this distortion is greatly reduced. A further improvement in the reduction of harmonics is shown in a waveform of the filter output currents $i_{fg1}, i_{fg2}, i_{fg3}$ in FIG. 4 with active damping, and additional active reduction of harmonics using the exemplary method as described above.

It should be mentioned that all of the steps of the exemplary method may be implemented in the form of software, which can then be loaded and then run for example on a computer system, in particular with a digital signal processor. The digital delay times which occur in systems such as this, in particular for the calculations, may be in general be taken into account, for example, by addition of an additional term to the fundamental angle $\omega t$ in the Park-Clarke transformation. Furthermore, the exemplary apparatus, as described in detail above, can also be implemented in a computer system, in particular in the digital signal processor.

Overall, it has been possible to show that the exemplary apparatus, e.g., as shown in FIG. 1, for carrying out the exemplary method for operation of the converter circuit can be implemented very easily and cost-effectively, since the circuit complexity is extremely low and, furthermore, only a small number of components are required to construct it. This exemplary apparatus therefore makes it possible to carry out the exemplary method particularly easily.

It will be appreciated by those skilled in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description and all changes that come within the meaning and range and equivalence thereof are intended to be embraced therein.

LIST OF REFERENCE SYMBOLS

1 Converter unit
2 Phase connection of the converter unit
3 LCL filter
4 Regulation device
5 Drive circuit
6 First calculation unit of the regulation device
7 Regulator unit
8 First proportional-integral regulator
9 Capacitive energy store
10 Second proportional-integral regulator
11 Third proportional-integral regulator
12 First adder
13 Second adder
14 Calculation unit for the regulator unit
15 Second calculation unit of the regulation device
16 third calculation unit of the regulation device

What is claimed is:

1. A method for operation of a converter circuit, in which the converter circuit has a converter unit with a multiplicity of drivable power semiconductor switches and an LCL filter which is connected to each phase connection of the converter unit,
in which the drivable power semiconductor switches are driven by means of a drive signal (S) which is formed from reference voltages ($u^*_1, u^*_2, u^*_3$),
wherein the reference voltages ($u^*_1, u^*_2, u^*_3$) are formed by subtraction of damping voltages ($u_{d1}, u_{d2}, u_{d3}$) from reference-phase connection voltages ($u^*_{i1}, u^*_{i2}, u^*_{i3}$), with the damping voltages ($u_{d1}, u_{d2}, u_{d3}$) being formed from filter capacitance currents ($i_{Cf1}, i_{Cf2}, i_{Cf3}$), weighted with a variable damping factor ($K_f$) of the LCL filter, and wherein the filter capacitance currents ($i_{Cf1}, i_{Cf2}, i_{Cf3}$) are filtered by means of a high-pass filter,
wherein the reference-phase connection voltages ($u^*_{i1}, u^*_{i2}, u^*_{i3}$) are formed from a d-component of the Park-Clarke transformation (produced by regulation of a dc voltage ($u_{dc}$) of a capacitive energy store which is connected to the converter unit (1) at a dc voltage reference value ($u^*_{dc}$) of reference-phase connection currents ($i^*_{fid}$) and from a predeterminable q-component of the Park-Clarke transformation of the reference-phase connection currents ($i^*_{fiq}$).

2. The method as claimed in claim 1, wherein the d-component of the Park-Clarke transformation of reference-filter output voltages ($u^*_{gd}$) is produced by regulation of the d-component of the Park Clarke transformation of phase connection currents ($i_{fid}$) at the sum of the d-component of the Park-Clarke transformation of the reference-phase connection currents ($i^*_{fid}$) and a d-component of the Park-Clarke transformation of at least one harmonic of filter output currents ($i^*_{fghd}$) with respect to the fundamental of the filter output currents ($i_{fg1}, i_{fg2}, i_{fg3}$), and
wherein the q-component of the Park-Clarke transformation of the reference-filter output voltages ($u^*_{gq}$) is produced by regulation of the q-component of the Park-Clarke transformation of the phase connection currents ($i_{fiq}$) at the sum of the q-component of the Park-Clarke transformation of the reference-phase connection currents ($i^*_{fiq}$) and a q-component of the Park-Clarke transformation of at least one harmonic of the filter output currents ($i^*_{fghq}$) with respect to the fundamental of the filter output currents ($i_{fg1}, i_{fg2}, i_{fg3}$).

3. The method as claimed in claim 2, wherein the d-component of the Park-Clarke transformation of the reference-phase connection voltages ($u^*_{id}$) is produced by the sum of the d-component of the Park-Clarke transformation of the reference-filter output voltages ($u^*_{gd}$) and the d-component of filter output voltages ($u_{gd}$) and a d-component of the Park-Clarke transformation of at least one harmonic of the filter output voltages ($u^*_{ghd}$), and
wherein the q-component of the Park-Clarke transformation of the reference-phase connection voltages ($u^*_{iq}$) is produced by the sum of the q-component of the Park-Clarke transformation of the reference-filter output voltages ($u^*_{gq}$) and the q-component of the Park-Clarke transformation of the filter output voltages ($u_{gq}$) and a q-component of the Park-Clarke transformation of at least one harmonic of the filter output voltages ($u^*_{ghq}$).

4. The method as claimed in claim 3, wherein the reference-phase connection voltages ($u^*_{i1}$, $u^*_{i2}$, $u^*_{i3}$) are produced by inverse Park-Clarke transformation of the d-component of the Park-Clarke transformation of the reference-phase connection voltages ($u^*_{id}$) and the q-component of the Park-Clarke transformation of the reference-phase connection voltages ($u^*_{iq}$).

5. An apparatus for carrying out a method for operation of a converter circuit, in which the converter circuit has a converter unit with a multiplicity of drivable power semiconductor switches and an LCL filter which is connected to each phase connection of the converter unit, having a regulation device which is used for production of reference voltages ($u^*_1$, $u^*_2$, $u^*_3$) and is connected via a drive circuit for formation of a drive signal (S) to the drivable power semiconductor switches, wherein the regulation device has a first calculating unit for formation of reference voltages ($u^*_1$, $u^*_2$, $u^*_3$) from the subtraction of damping voltages ($u_{d1}$, $u_{d2}$, $u_{d3}$) from reference-phase connection voltages ($u^*_{i1}$, $u^*_{i2}$, $u^*_{i3}$), with the first calculation unit being supplied with reference-phase connection voltages ($u^*_{i1}$, $u^*_{i2}$, $u^*_{i3}$) and, in order to form the damper voltages ($u_{d1}$, $u_{d2}$, $u_{d3}$), filter capacitance currents ($i_{Cf1}$, $i_{Cf2}$, $i_{Cf3}$) of the LCL filters, and a regulator unit, with the filter capacitance currents ($i_{Cf1}$, $i_{Cf2}$, $i_{Cf3}$) being filtered by means of a high-pass filter, wherein the regulator unit has a first proportional-integral regulator to whose input side the difference between a dc voltage ($u_{dc}$) of a capacitive energy store, which is connected to the converter unit and a dc voltage reference value ($u^*_{dc}$) are supplied, and on whose output side a d-component of the Park-Clarke transformation of reference-phase connection currents ($i^*_{fid}$) is produced.

6. The apparatus as claimed in claim 5, wherein the regulator unit has a second proportional-integral regulator, to whose input side the difference between the sum of the d-component of the Park-Clarke transformation of the reference-phase connection currents ($i^*_{fid}$) and a d-component of the Park-Clarke transformation of at least one harmonic of the filter output currents ($i^*_{fghd}$) with respect to the fundamental of filter output currents ($i_{fg1}$, $i_{fg2}$, $i_{fg3}$) and the d-component of the Park-Clarke transformation of the phase connection currents ($i_{fid}$) are supplied, and on whose output side the d-component of the Park-Clarke transformation of the reference-filter output voltages ($u^*_{gd}$) is produced, and wherein the regulator unit has a third proportional-integral regulator, to whose input side the difference between the sum of the q-component of the Park-Clarke transformation of the reference-phase connection currents ($i^*_{fiq}$) and a q-component of the Park-Clarke transformation of at least one harmonic of the filter output currents ($i^*_{fghq}$) with respect to the fundamental of the filter output currents ($i_{fg1}$, $i_{fg2}$, $i_{fg3}$) and the q-components of the Park-Clarke transformation of the phase connection currents ($i_{fiq}$) are supplied, and on whose output side the q-component of the Park-Clarke transformation of the reference-filter output voltages ($u^*_{gq}$) is produced.

7. The apparatus as claimed in claim 6, wherein the regulator unit has a first adder for production of the d-component of the Park-Clarke transformation of the reference-phase connection voltages ($u^*_{id}$), to which the d-component of the Park-Clarke transformation of the reference-filter output voltages ($u^*_{gd}$), the d-component of filter output voltages ($u_{gd}$) and a d-component of the Park-Clarke transformation of at least one harmonic of filter output voltages ($u^*_{ghd}$) are supplied, and wherein the regulator has a second adder for production of the q-component of the Park-Clarke transformation of the reference-phase connection voltages ($u^*_{iq}$), to which the q-component of the Park-Clarke transformation of reference-filter output voltages ($u^*_{gq}$), the q-component of the Park-Clarke transformation of filter output voltages ($u_{gq}$) and a q-component of the Park-Clarke transformation of at least one harmonic of the filter output voltages ($u^*_{ghq}$) are supplied.

8. The apparatus as claimed in claim 7, wherein the regulator unit has a calculation unit for formation of the reference-phase connection voltages ($u^*_{i1}$, $u^*_{i2}$, $u^*_{i3}$) by inverse Park-Clarke transformation, to whose input side the d-component of the Park-Clarke transformation of the reference-phase connection voltages ($u^*_{id}$) and the q-component of the Park-Clarke transformation of the reference-phase connection voltages ($u^*_{iq}$) are supplied.

9. The apparatus as claimed in claim 5, wherein the regulation device has a second calculation unit for the formation of a d-component of the Park-Clarke transformation of at least one harmonic of filter output currents ($i^*_{fghd}$) with respect to the fundamental of the filter output currents ($i_{fg1}$, $i_{fg2}$, $i_{fg3}$), of a q-component of the Park-Clarke transformation of at least one harmonic of filter output currents ($i^*_{fghq}$) with respect to the fundamental of the filter output currents ($i_{fg1}$, $i_{fg2}$, $i_{fg3}$), of the d-component of the Park-Clarke transformation of the at least one harmonic of reference-filter output voltages ($u^*_{ghd}$) and of the q-component of the Park-Clarke transformation of the at least one harmonic of reference-filter output voltages ($u^*_{ghq}$), with the input side of the second calculation unit being supplied with the d-component of the filter output voltages ($u_{gd}$), with the q-component of the filter output voltages ($u_{gq}$), the phase connection currents ($i_{fi1}$, $i_{fi2}$, $i_{fi3}$), the filter capacitance currents ($i_{Cf1}$, $i_{Cf2}$, $i_{Cf3}$) and the fundamental angle ($\omega t$) of filter output voltages ($u_{g1}$, $u_{g2}$, $u_{g3}$).

10. The apparatus as claimed in claim 9, wherein the regulation device has a third calculation unit for formation of the d-component of the Park-Clarke transformation of the filter output voltages ($u_{gd}$), of the q-component of the Park-Clarke transformation of the filter output voltages ($u_{gq}$) and of the fundamental angle ($\omega t$) of the filter output voltages ($u_{g1}$, $u_{g2}$, $u_{g3}$), with the input side of the third calculation unit being supplied with filter output voltages ($u_{g1}$, $u_{g2}$, $u_{g3}$) of the LCL filters.

11. The apparatus as claimed in claim 8, wherein the regulation device has a second calculation unit for the formation of a d-component of the Park-Clarke transformation of at least one harmonic of the filter output currents ($i^*_{fghd}$) with respect to the fundamental of the filter output currents ($i_{fg1}$, $i_{fg2}$, $i_{fg3}$), of a q-component of the Park-Clarke transformation of at least one harmonic of the filter output currents ($i^*_{fghq}$) with respect to the fundamental of the filter output currents ($i_{fg1}$, $i_{fg2}$, $i_{fg3}$), of the d-component of the Park-Clarke transformation of the at least one harmonic of the reference-filter output voltages ($u^*_{ghd}$) and of the q-component of the Park-Clarke transformation of the at least one harmonic of the reference-filter output voltages ($u^*_{ghq}$), with the input side of the second calculation unit being supplied with the d-component of the filter output voltages ($u_{gd}$), with the q-component of the filter output voltages ($u_{gq}$), the phase connection currents ($i_{fi1}$, $i_{fi2}$, $i_{fi3}$), the filter capacitance currents ($i_{Cf1}$, $i_{Cf2}$, $i_{Cf3}$) and the fundamental angle ($\omega t$) of the filter output voltages ($u_{g1}$, $u_{g2}$, $u_{g3}$).

* * * * *